Dec. 2, 1958   R. L. BEEBE   2,862,282
FLY CASTING LINE WITH TAPERED CELLULAR
WATERPROOF PLASTIC COATING
Filed Dec. 27, 1954   2 Sheets-Sheet 1
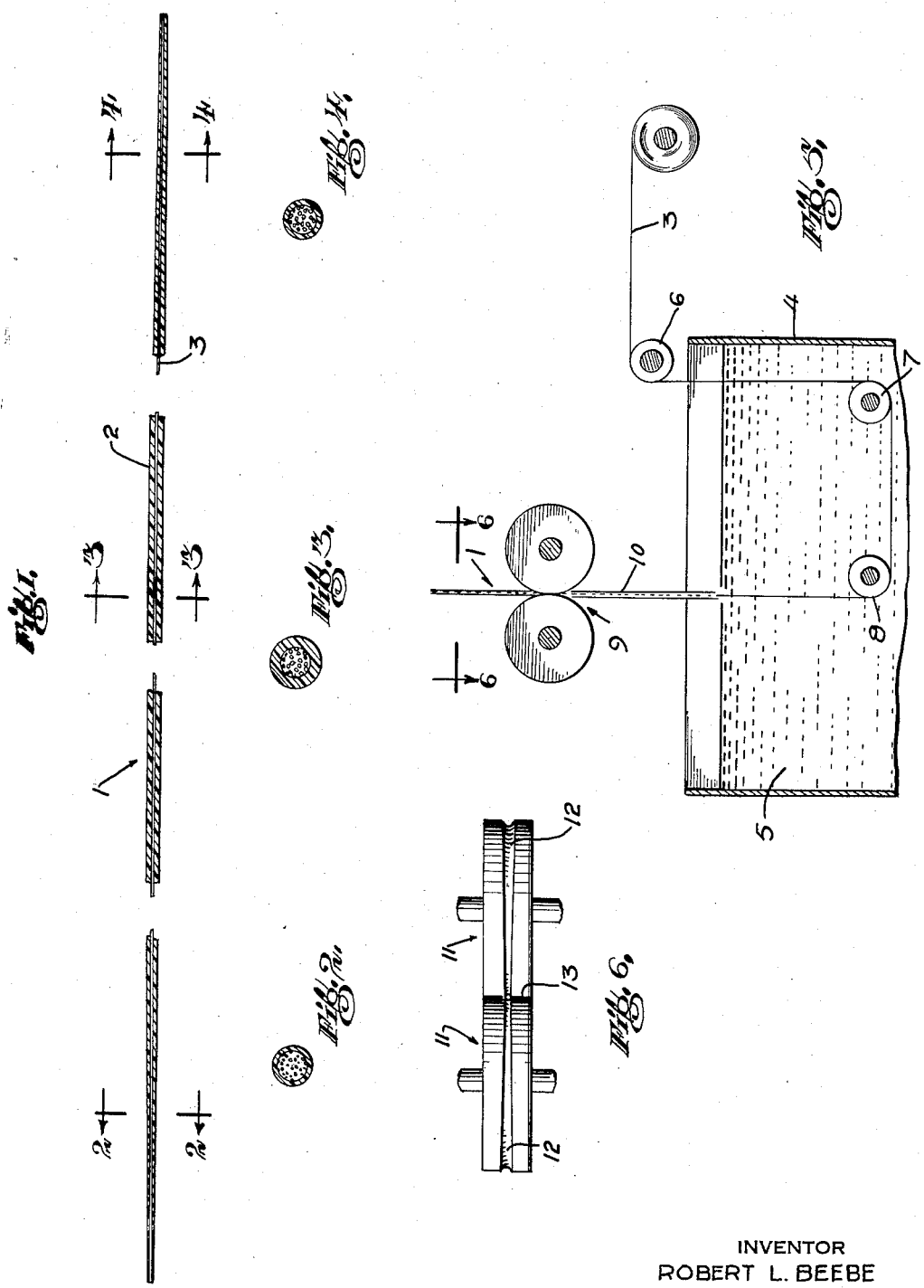
INVENTOR
ROBERT L. BEEBE
BY
Kenyon & Kenyon
ATTORNEYS Dec. 2, 1958
R. L. BEEBE
2,862,282
FLY CASTING LINE WITH TAPERED CELLULAR
WATERPROOF PLASTIC COATING
Filed Dec. 27, 1954
2 Sheets-Sheet 2
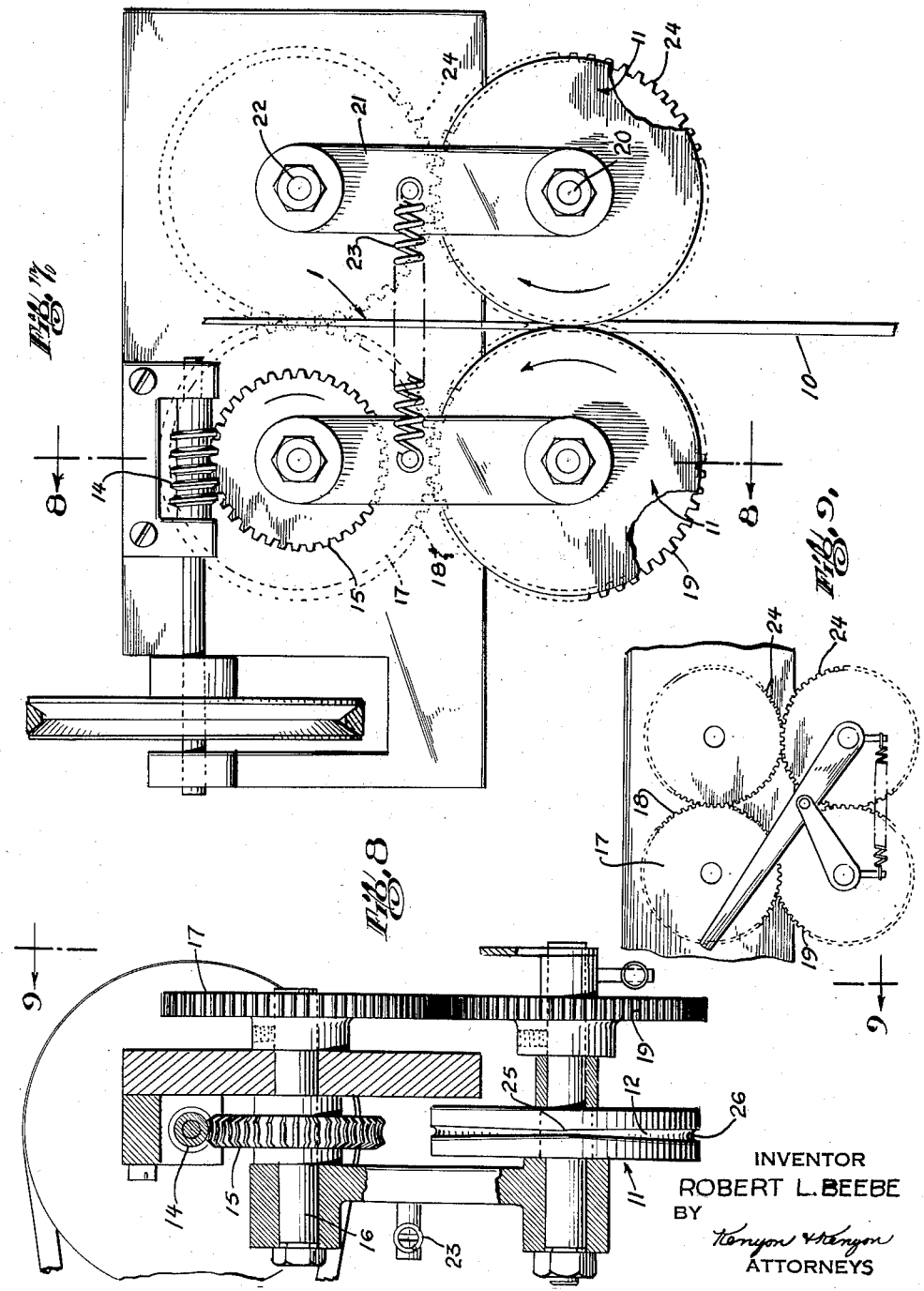
INVENTOR
ROBERT L. BEEBE
BY
Kenyon & Kenyon
ATTORNEYS United States Patent Office 2,862,282
Patented Dec. 2, 1958

2,862,282

FLY CASTING LINE WITH TAPERED CELLULAR WATERPROOF PLASTIC COATING

Robert L. Beebe, Estherville, Iowa, assignor, by mesne assignments, to Soo Valley Company, Estherville, Iowa, a corporation of Iowa Application December 27, 1954, Serial No. 477,750

2 Claims. (Cl. 28—80)

This invention relates to fishing lines and particularly to tapered lines for fly casting.

Such lines may be either the conventional double tapered line or the more recently developed torpedo head line or the single tapered line. In all of these lines heretofore, it has been customary to form a tapered core line by braiding. The taper and reduction in diameter has been made by using special machines requiring practically constant operator attention, a series of bobbin changes being necessary to introduce heavier or finer threads to increase or diminish the line diameters to form the tapered core. After the formation of the core the line is coated with a substantially uniform layer of suitable coating material which gives the line a smooth even surface. After application and curing of this coating, it is honed and polished, giving the final desired smooth finish with uniform tapers between portions having different outer diameters.

In the older form of fly lines, it was customary to utilize a coating material which filled the voids in the surface of the braided line and built up a protective water resistant coating. More recently the coating materials employed have been synthetic plastic materials which could be treated so that on curing they became cellular in internal form, thus giving greater buoyancy to the line.

Generally speaking, the fisherman has had to rely upon some form of line dressing to make the line float when used in connection with dry flies. Various forms of line dressing have been employed, all of which generally tend to make the surface of the line water repellant so that surface tension phenomena cause it to float, although in the later developed lines the cellular interior structure of the coating materials has aided materially, causing the line to float by reducing the overall specific gravity of the combined core and coating material making up the line.

The above mentioned forms of fly-casting lines had various drawbacks. When the line was formed from a braided tapered core in which threads were cut to bring about the taper, the taper of the core was not perfect, and the outer layer or coating had to be relied upon to smooth over the surface of the line at the taper. The honing and polishing of the line tended to reduce the thickness of the coating at these points which are the points of greatest wear, thus creating an undesirable situation. Furthermore, when a line was made of relatively large diameter, it was difficult to float the line in use. The line itself, even with cellular coating material, tended to have a specific gravity higher than water and the surface tension phenomena which would bring about floating of a line of small diameter would not cause the larger diameter line to float. This difficulty was particularly undesirable in cases of the torpedo head lines, where the belly of the line was made of relatively heavy line to give the necessary weight for casting the line.

Furthermore the prior tapered lines were costly to produce.

One of the objects of the present invention is to overcome the above difficulties.

Another object of the invention is to provide a tapered fly line which can be made without the formation of a tapered braided core.

Another object of the invention is to provide such a fly line in which the taper is obtained on a core by merely forming and moulding plastic coating material to give the line the desired outer contours.

Another object of the invention is to provide such a line which is more buoyant than lines heretofore made, particularly in the large cross-sections where surface tension phenomena are not as effective in floating the line as in the cases of lines having smaller cross-sectional diameters.

Another object of the invention is to provide a fly line which can be made less expensively than heretofore.

Another object of the invention is to produce a fly line which can be made easily and simply by easy and simple methods and machinery in a mass production manner.

Another object of the invention is to provide an improved method for producing fly lines.

Another object of the invention is to provide an improved machine for making such lines simply, quickly and easily.

Other objects and advantages of the invention will be apparent from a consideration of the following description.

For the purpose of illustrating the invention, there are shown in the accompanying drawings forms thereof which are at present preferred since they give desirable and satisfactory results. It will be understood, however, that the various elements which go to make up the inventions may be variously arranged and organized and that the invention is not limited to the specific arrangements shown and described.

In the drawings—

Fig. 1 is a broken view in section of a fly line embodying the invention;

Fig. 2 is a sectional view taken on the line 2—2 of Fig. 1;

Fig. 3 is a sectional view taken on the line 3—3 of Fig. 1;

Fig. 4 is a sectional view taken on the line 4—4 of Fig. 1;

Fig. 5 is a view of and apparatus suitable for carrying out the invention;

Fig. 6 is a partial view taken on the line 6—6 of Fig. 5, showing the variable orifice mechanism in controlling the outer coating or layer on the line;

Fig. 7 is a detailed view of the orifice mechanism;

Fig. 8 is a sectional view taken on the line 8—8 of Fig. 7; and

Fig. 9 is a view showing how the orifice mechanism is driven and controlled.

The invention consists generally in forming a fly casting line with an outer layer which tapers smoothly between sections of different outer diameter. This outer layer overlies and is bonded to a central core which in the preferred form of the invention is of a uniform diameter less than the smallest outer diameter of the outer layer. The outer layer consists preferably of cellular water-proof plastic material and the inner layer is preferably a multifilament core of nylon fiber or other material suitable for fish lines.

The method of making the line consists generally moving the inner core longitudinally of itself and applying a coating of plastic material thereto. This material is of a consistency to stay in place on the core during the feeding and other manipulations. After it has been deposited on the core, the plastic material is moulded to the desired form tapering smoothly from different outer diameters. This is done by passing the line with the plastic coating material thereof through an orifice which is of the proper size to contact the plastic coating material and restrict the amount which is left on the finished line, and by varying the size of the orifice as the line with the coating material thereon passes through the orifice.

The machine consists generally in means for forwarding the line longitudinally of itself, means for applying a layer of the plastic to the line and a variable orifice. In the preferred form of the invention, this orifice consisting of a pair of opposed rollers. Each roller has a tapered circumferential groove of semi-circular cross-sections of varying diameter. These grooves are placed in matching opposition to one another so that the points thereon of equal diameter meet one another as the rollers rotate. Means are provided for driving the rollers at a circumferential speed less than the speed at which the line passes between them, thus varying the size of the orifice and limiting the amount of plastic material left on the line and smoothing and compressing this material and compacting it on the line to give the desired tapered contour. The preferred circumferential speed is one which insures one revolution of the circular dies for each completed tapered line, for example on 90 foot tapers which are the length accepted by the trade the dies are driven at a speed to make four degrees of turning or rotation for each lineal foot of line. In all events grooves on the circular dies are designed to complete a finished line with one complete revolution. The turning speed is adjusted to accomplish this for any length of line desired. This makes the operation continuous.

The plastic material employed may be vinyl plastic and in the preferred form of the invention, the plastic is of cellular formation. This cellular formation is produced in a manner well known in the art, consisting of supplying in the plastic material a substance which on curing will cause the formation of bubbles, thus giving the cellular construction. The coating material is, of course, waterproof.

One form of line embodying the present invention is shown in Figs. 1 through 4. The line indicated generally at 1 consists of an outer layer 2 which tapers smoothly between different outer diameters. One of the sections of larger diameter is indicated in Fig. 3, whereas sections of smaller diameter are indicated in Figs. 2 and 4. The outer layer overlies and is bonded to a central inner core 3 which is preferably of uniform diameter, but which may be made up of spliced sections of different diameter. The outer diameter of the core 3 is preferably less than the smallest outer diameter of the overlying outer layer.

The inner core 3 is preferably multi-filament nylon cord although it can be of any fiber suitable for fishline construction. It may be braided or twisted or the filaments may be laid parallel.

The coating material forming the outer layer 2 is a vinyl plastic which can be purchased in the open market. In the preferred form of the invention, it contains a gas forming element which causes gas to form when it is heated during curing.

The vinyl plastic is obtainable from The Chemical Products Corp., King Phillip Road, East Providence, Rhode Island, as "Vinyl Plastisol" and the material containing the gas forming element is sold under the designation "Foam Chemisol." The line may be made of any suitable dimensions. The core member may be .030 inch. The central portion or larger portion of the line may have an outer diameter of 0.50 inch. This would be known as a "C" line.

By using the resin with the gas forming element the line is given the most desirable floating characteristics. In the central or heavy portion of the line, which would ordinarily be most difficult to float, the total specific gravity is lower than in ordinary braided tapered line, because the amount of core is smaller in proportion to the total, and the balance of the line, namely the outer layer, is made up of the cellular plastic material. The portions of the line of smaller diameter are not as difficult to float so that the entire line has overall improved floating characteristics.

The line is made by means of the apparatus shown and the method illustrated in Figs. 5 through 9. The central core 3 of the line is fed to a tank 4 which contains the plastic coating material 5. The line passes over pulleys 6, 7 and 8 and passes up out of the tank to the variable orifice shown generally at 9. The plastic material adheres to the line as it moves upwardly as shown in Fig. 5 forming a layer consisting of an excess of the material as indicated at 10.

The coating material is of a consistency to stay in place on the core without running and it is moulded to the desired form and diameter as it passes through the adjustable orifice. It is pulled by ordinary line pulling mechanisms which are not shown in the drawing.

The variable orifice consists of a pair of opposed rollers 11, each of which has a circumferential groove 12 therein. These grooves are of semi-circular cross-section as is shown in Fig. 6, and they taper smoothly from different diameters. They are disposed so that the diameters match at the point of tangency of the rollers, which is indicated at 13 and the diameters match throughout the rotation of the rollers 11.

Means are provided for driving these rollers at the same circumferential speed. These means consist of a worm 14 and a worm gear 15 which is mounted on the shaft 16 on which is mounted a gear 17 which has teeth 18 which mesh with teeth 19 of a gear which is mounted on the shaft which carries one of the rollers 11. The right-hand roller 11 indicated in Fig. 7 is mounted on a shaft 20 which is mounted on a pivoted arm 21 which is pivoted at 22. A spring 23 holds the arm shown in the position in Fig. 7 with the rollers in face-to-face contact. A gear 24 which is in mesh with the teeth 19 is fixed on the shaft 20 in driving relation thereto so as to rotate the right-hand roller 11 so that there is a positive drive of the rollers in synchronization.

Spring 23 serves as a positive closing mechanism when a knot is eased through the orifice; it also prevents the driving gears from getting out of mesh or time.

In operation, the core 3 is fed through the tank 4 as indicated above and through the orifice. The rollers 11 are driven by a mechanism not shown at a rate such that their circumferential speed is less than the speed of the lineal advancement of the core. They thus serve to wipe and compact the plastic material onto the core as it passes between the roller.

The grooves in the rollers are tapered as described above and as can be seen in Fig. 8 the rollers may have grooves which taper from the minimum diameter as indicated at 25 in Fig. 8 to a maximum diameter indicated at 26 in Fig. 8.

For making torpedo head lines the form of the groove is appropriately varied to position the greater diameter closer to the end of the line while the remainder of the groove which forms the long level shooting line is more nearly the diameter indicated at 25 in Fig. 8.

After the plastic material has been applied to the line, the line is carried to a suitable heater or oven for curing the plastic. Thereafter the line is ready for use.

The foregoing description of the invention has shown one embodiment thereof. However, it will be understood that other embodiments of the invention can be made and that the foregoing description is merely illustrative and not restricted. Reference is to be had to the appended claims rather than to the foregoing description to indicate the scope of the invention.

What is claimed is:

1. A line for fly-casting comprising an outer layer tapered smoothly between different outer diameters and overlying and bonded to a central inner core of a uniform diameter less than the smallest outer diameter of said outer layer, said outer layer comprising cellular waterproof plastic material and said inner layer comprising a multi-filament nylon cord.

2. A line for fly-casting comprising an outer layer tapering smoothly between different outer diameters and overlying and bonded to a central inner core of a uniform diameter less than the smallest outer diameter of said outer layer, said outer layer comprising cellular waterproof plastic material and said inner layer comprising a cord.

References Cited in the file of this patent

UNITED STATES PATENTS

| | | |
|---|---|---|
| 1,777,096 | La Chapelle | Sept. 30, 1930 |
| 1,829,904 | Lilienfeld | Nov. 3, 1931 |
| 1,842,169 | Hedden | Jan. 19, 1932 |
| 1,914,174 | Smith | June 13, 1933 |
| 2,062,389 | Bleibler | Dec. 1, 1936 |
| 2,065,606 | Moore | Dec. 29, 1936 |
| 2,159,152 | Hershberger | May 23, 1939 |
| 2,380,729 | Kierspe | July 31, 1945 |
| 2,536,312 | Saether | Jan. 2, 1951 |
| 2,684,552 | Berlew | July 27, 1954 |

FOREIGN PATENTS

| | | |
|---|---|---|
| 1,047,597 | France | July 22, 1953 |

OTHER REFERENCES

Field and Stream, April 1954, page 99.